United States Patent [19]

Moran et al.

[11] Patent Number: 5,509,114
[45] Date of Patent: Apr. 16, 1996

[54] METHOD AND APPARATUS FOR CORRECTING AND/OR ABORTING COMMAND GESTURES IN A GESTURE BASED INPUT SYSTEM

[75] Inventors: Thomas P. Moran, Palo Alto; Gordon P. Kurtenbach, Mountain View, both of Calif.

[73] Assignee: Xerox Corporation, Stamford, Conn.

[21] Appl. No.: 175,850

[22] Filed: Dec. 30, 1993

[51] Int. Cl.$^6$ .................................................. G06F 15/00
[52] U.S. Cl. ......................................................... 395/143
[58] Field of Search .................................... 395/155, 161, 395/140, 141, 142, 143; 345/18, 22

[56] References Cited

PUBLICATIONS

"Symbolic Construction of a 2-D Scale–Space Image," IEEE Transactions on Pattern Anaysis and Machine Intelligence, Eric Saund, Aug. 1990, vol. 12, No. 8.

"Issues in Combining Marking and Direct Manipulation Techniques", Gordon Kurtenbach and William Buxton, Nov. 11–13, UIST 1991, pp. 137–144.

aha! InkWriter Quick Reference Guide and Handbook, aha! Software Corporation, Copyright 1993.

*Primary Examiner*—Phu K. Nguyen
*Attorney, Agent, or Firm*—Rosen Dainow & Jacobs

[57] ABSTRACT

In a graphical editing system, a user may both reshape and/or abort a command gesture already drawn. The gesture is retraced by the user by backtracing over the gesture, i.e., drawing backwards over the gestural mark. As the user traces backwards over the gesture, the system detects a reverse in direction, and the gesture is erased. When the user draws in a direction that is not tracing backwards over the gesture, the change in direction is sensed and the gesture is continued. To abort a gesture, it is retraced back to its origin.

36 Claims, 4 Drawing Sheets

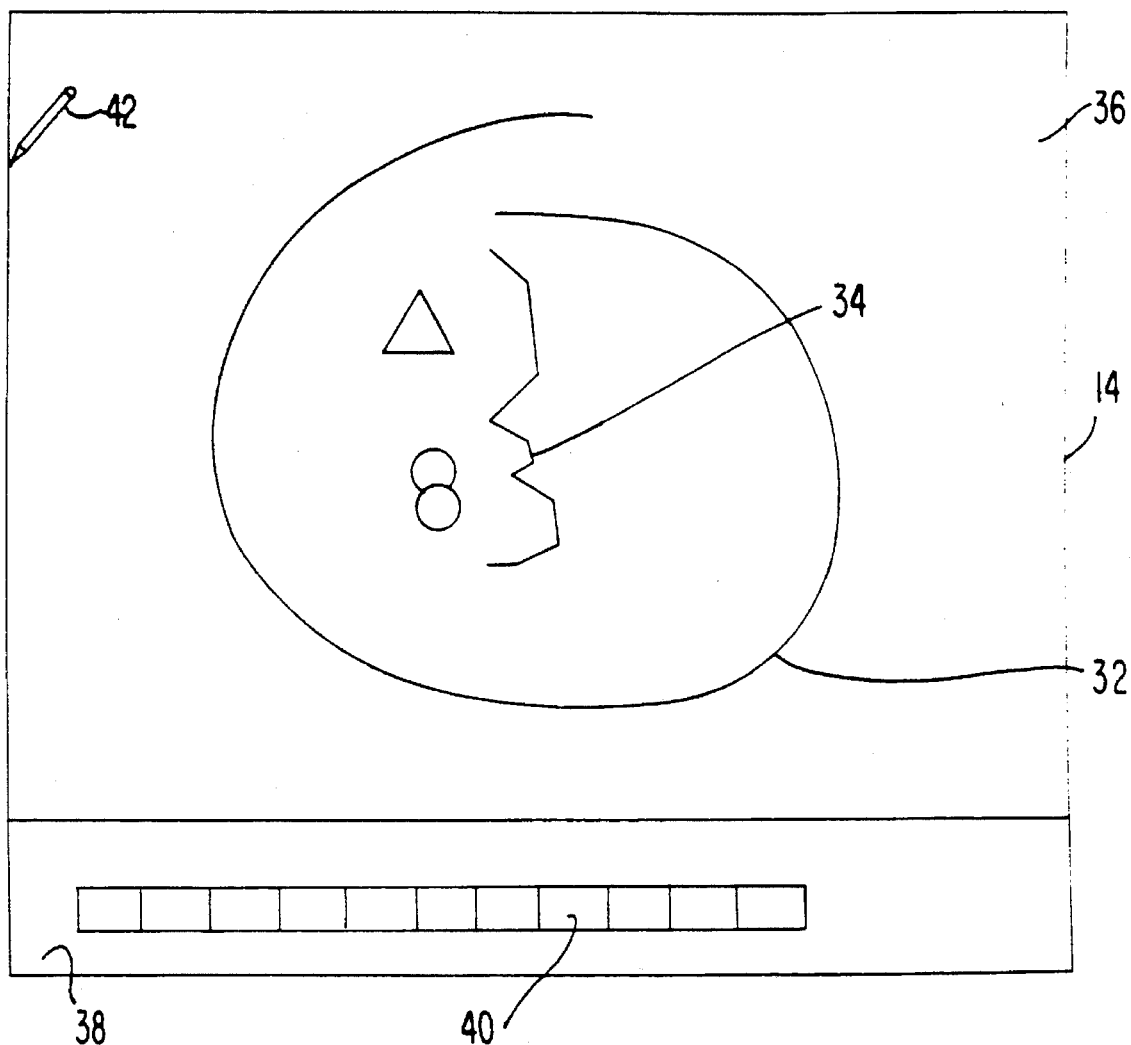
FIG.2a
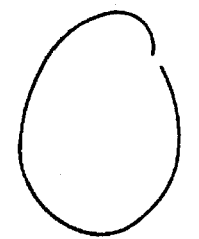
FIG.2b                    FIG.2c

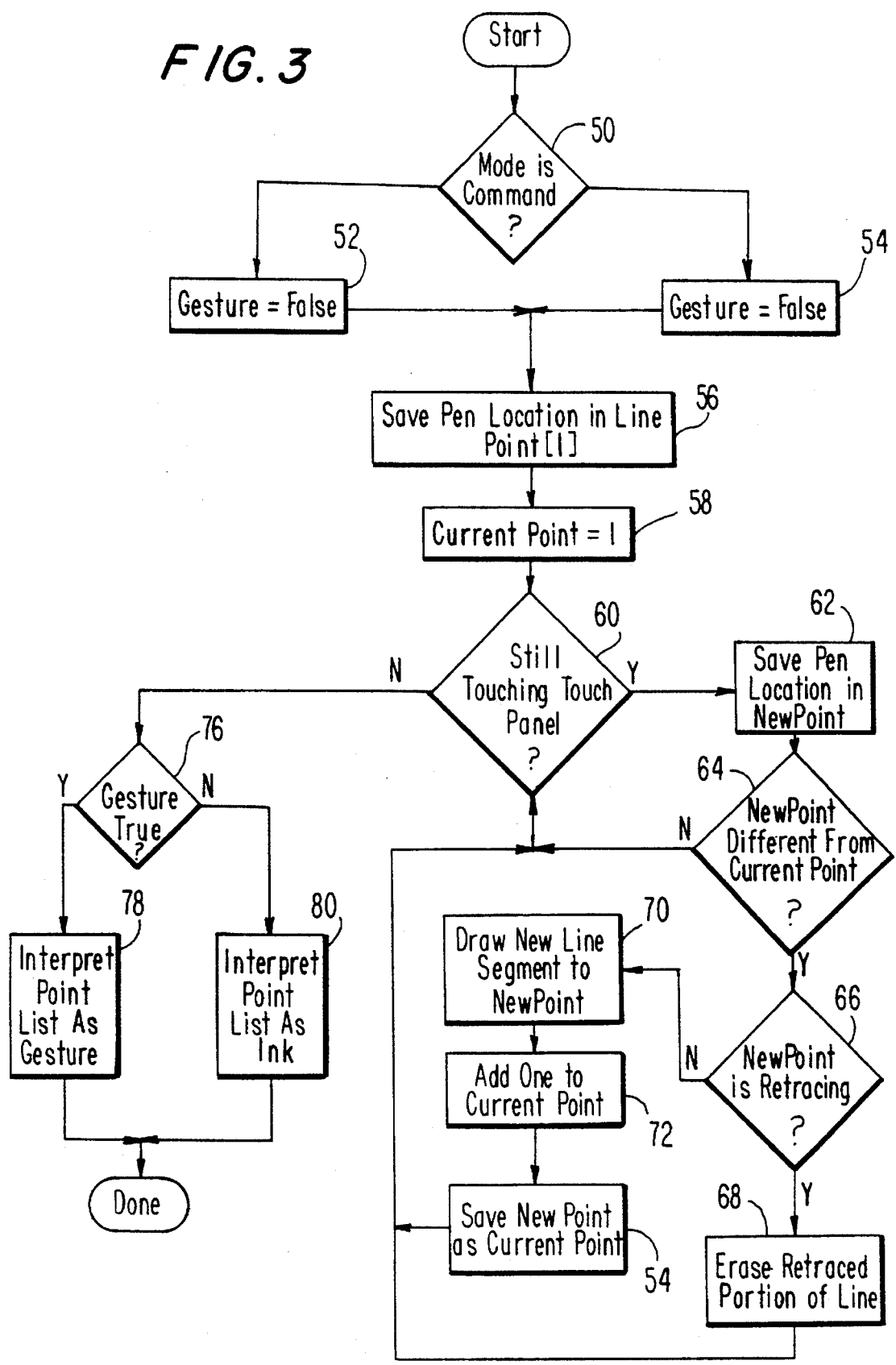

METHOD AND APPARATUS FOR CORRECTING AND/OR ABORTING COMMAND GESTURES IN A GESTURE BASED INPUT SYSTEM

RELATED APPLICATIONS

This application is related to Ser. No. 07/869,554, filed Apr. 15, 1992, (attorney docket XRX-118); Ser. No. 07/868,559, filed Apr. 15, 1992 (attorney docket XRX-119); Ser. No. 08/101,646, filed Aug. 4, 1993, (attorney docket XRX-136); Ser. No. 08/101,645, filed Aug. 4, 1993 (attorney docket XRX-137); Ser. No. 08/136,360 filed Oct. 14, 1993 entitled Apparatus and Method for Generating Place-holders in a Touch Based Input System (attorney docket XRX-138); Ser. No. 08/175,853, filed Dec. 30, 1993 (attorney docket number XRX-144) entitled Apparatus and Method for Executing Multiple Concatenated Command Gestures in a Gesture Based Input System; Ser. No. 08/175,841, filed Dec. 30, 1993 (attorney docket XRX-150), entitled Apparatus and Method for Altering Enclosure Selections In a Gesture Based Input System; Ser. No. 08/175,846 filed Dec. 30, 1993 (attorney docket XRX-143), entitled Apparatus and Method for Translating Graphic Objects and Commands with Direct Touch Input In a Touch Based System; and Ser. No. 08/176,150 filed Dec. 30, 1993 (attorney Docket XRX-149) entitled Apparatus and Method for Supporting the Implicit Structure of Freeform Lists, Outlines, Text, Tables and Diagrams in a Gesture-Based Input System and Editing System, all assigned to the present assignee, the disclosures of which are in their entirety, each specifically incorporated by reference herein.

FIELD OF THE INVENTION

This invention pertains to an information input system and method and more particularly to a "gesture based" graphical input system that receives information by sensing the motion of a stylus, pen, finger or mouse.

BACKGROUND OF THE INVENTION

Computer graphic operations that are initiated by pointing devices are typically two types: drawing operations and control operations. Drawing operations describe loci for the generation and display of visible marks or other functions on the image, analogous to drawing on a piece of paper by making a motion with a pen in contact with the surface. Control operations are used to initiate and guide the execution of computer functions leading to modification of the visible marks. Control operations are especially important to the performance of editing functions such as erasing, moving, or changing the visual qualities (e.g. line width) of visible marks of the image.

With most user interface systems, control functions are generally instituted by giving commands to the system (e.g., keyboard command languages, menuing techniques, etc.). Giving commands can be simplified into two parts: specifying (creating or selecting) the command and issuing it, i.e., telling the system to "execute it." Often times users specify, commands they wish to change, adjust or abort before they are issued to the system.

In keyboard command languages, the command is typed in and then issued with the Return or enter key. Usually, the commands can be edited before they are issued. If no specified control key is available to edit the command then the backspace can be used. Often times the whole specified command can be cleared by some control key. In menus, the user can move about the menu selecting or deselecting different items. Even when the menus are hierarchic, it is possible to descend and ascend in the menu hierarchy before selecting an item. An item is issued by the user pressing or lifting a button on the pointing device. If the user does not want to issue any of the items on the menu, the pointing device is moved off of the menu, (called a null selection) before the issuing action.

In gesture-based input systems such as a pen-based notebook computer or a Liveboard (trademark of Xerox Corporation) or a graphical user interface using a mouse, control operations on specific objects entered in the system are given by commands called gestures. A gesture is a hand-drawn command, and it is a mark created with a stylus input device that is interpreted by the system as designating an action for the system to perform. Objects are input into the system by simply drawing ("inking") freehand marks. Such marks are then data objects in the system.

In order to institute a simple control command by gesture, the user would draw a gesture which represents some desired function and then commit to the command by lifting the input device (e.g. stylus) from the input surface of a display or a button on the device (e.g. mouse). That is, the completed gesture is sensed and after lifting the stylus from the input surface of the display the computer is instructed to execute the particular command. However, if the user sees that a partially drawn gesture is incorrect, he has no recourse but to issue the command, e.g., lift the stylus, and hope the gesture drawn is not harmful to what is actually drawn before redrawing the gesture correctly.

In a gesture based input system, it is desirable to allow the user to redraw or abort an incomplete gesture.

OBJECTS AND SUMMARY OF THE INVENTION

It is an object of the present invention to provide a method and apparatus that allows the user to redraw or abort an incomplete gesture.

It is another object of the present invention to provide a method and apparatus that allows the user to draw a complete or incomplete gesture, backtrace to erase the gesture, and draw the same or a new gesture.

The above object is achieved in accordance with the present invention by a a system which allows a user to reshape and/or abort a gesture. That is, it allows a user to retract the last part of the partially drawn gesture and then redraw it. If the user retracts the whole gesture, it is aborted.

A user can also backtrace and redraw within a gesture as many times as desired. For example, a user can draw a gesture, backtrace a portion of it, redraw part of it, backtrace again and redraw again. There is not a limit to the number of corrections that can be applied to a single gesture.

In particular, the present invention employs a technique which (1) detects when the user retraces an unwanted gesture by backtracing, i.e., detects when the user reverses direction and erases the gesture during backtrace, and at a point at which the user has sufficiently back traced to correct the gesture, (2) detects when the user is drawing the gesture in a new direction.

In accordance with the invention, a graphic editing system is provided including a surface and user controllable means for generating a line image on said surface. The system comprises first means responsive to a first user action for generating a first line image on said surface that terminates at first given coordinates on said surface and a second means responsive to a second user action subsequent said first user action that retraces at least a portion of said first line image from said first given coordinates back to second given coordinates for erasing said portion of said first line image.

The system further comprises third means responsive to a third user action that extends from said second given coordinates in a direction other than the direction that retraces said first line image for generating a second line image extending in said other direction from said second given coordinates.

In accordance with an aspect or the invention, a graphic editing system is provided including a surface and user controllable means for generating a line image on said surface. The system comprises a first means responsive to a first user action for generating a first line image on said surface that terminates at a first point on said first line image having given coordinates on said surface and a second means responsive to a second user action subsequent said first user action that retraces at least a portion of said first line image from said first point to a second point thereon for erasing said portion of said first line image between said first and second points on said first line image.

In accordance with another aspect of the invention, a method is provided for graphic editing on a surface in a system having a user controllable means for generating a line image on said surface. The method comprises the steps of generating a first line image on said surface in response to a first movement of said user controllable means on said surface, said first line image terminating at a first point on said first line image and having given coordinates on said surface and erasing only said first line image on said surface between said first point and a second point on said first line image in response to a second movement of said user controllable means continuously retracing said first line image, within a predetermined distance of said first line image, from said first point to said second point, subsequent said first movement.

BRIEF DESCRIPTION OF THE DRAWINGS

The invention is illustrated by way of example and not limited by the figures of the accompanying drawings in which like references denote like or corresponding parts and in which:

FIG. 2(a) is an elevational view of a display screen with a loop gesture enclosing several objects;

FIGS. 2(b) and 2(c) illustrate two different shapes for a selection command gesture;

FIG. 3 is a flowchart showing the sequence of operations for object manipulation including the operation for employing the present invention.

DESCRIPTION OF THE PREFERRED EMBODIMENT

Figure 1:
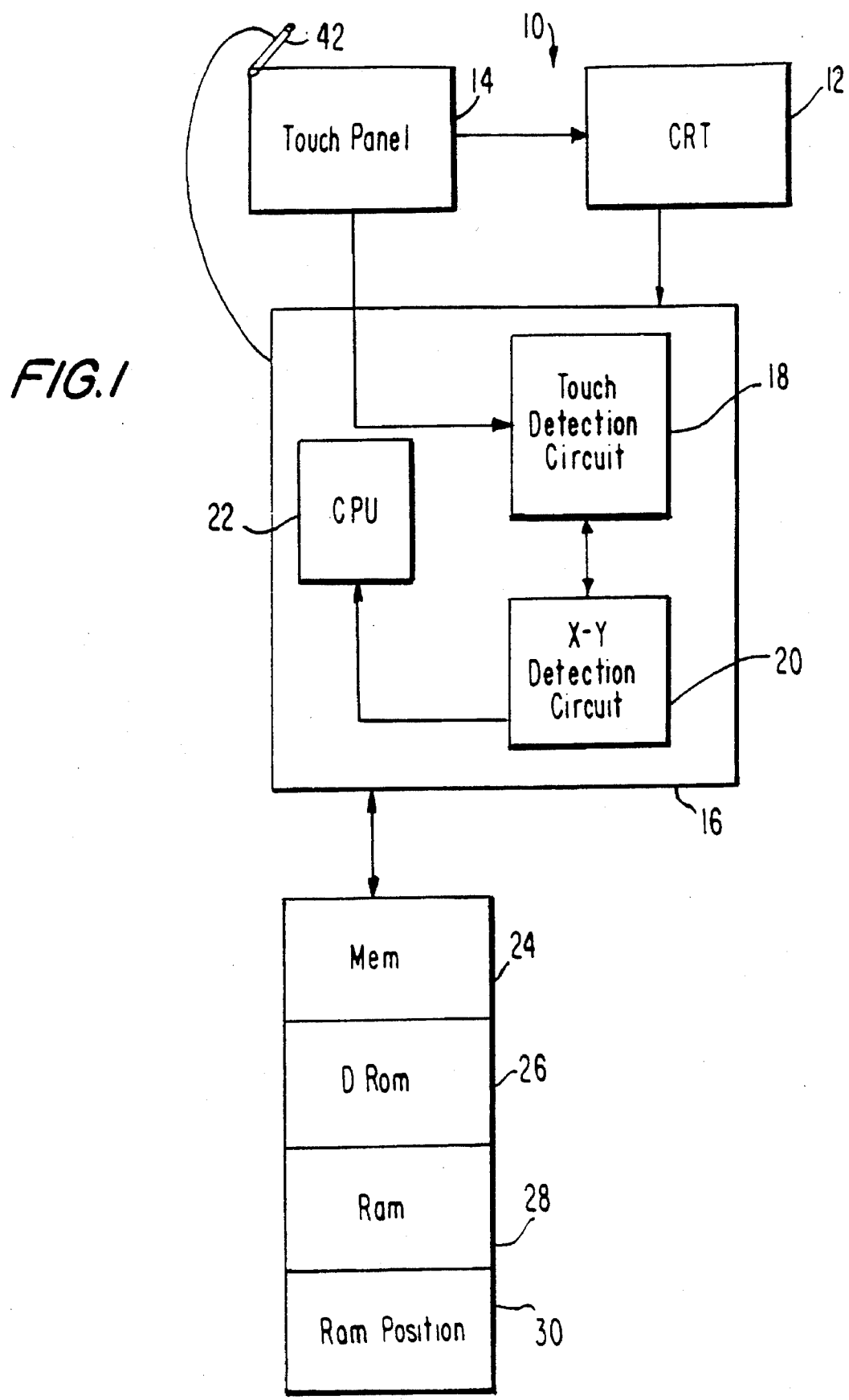
FIG. 1 is a block diagram illustrating one form of touch based input apparatus in which the system according to the present invention can be employed.
Figure 4A:
FIGS. 4(a)–(h) illustrate the backtracing system according to the preferred embodiment of the present invention.
Figure 4E:
Figure 4B:
Figure 4F:
Figure 4C:
Figure 4G:
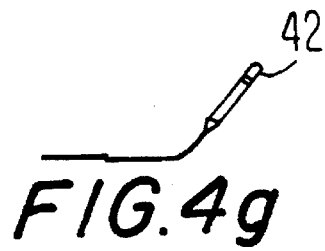
Figure 4D:
Figure 4H:
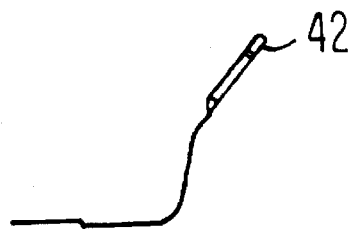

Referring to FIG. 1, there is shown a block diagram of the touch based input system 10 including a CRT display 12. A transparent touch-sensitive panel 14 is attached onto the surface of CRT display 12. Touch panel 14 is touched by a user, e.g. with a stylus 42 and the touch is detected by touch detection circuit 18.

The detected signal from touch detection circuit 18 is input to an X-Y detection circuit 20. X-Y detection circuit 20 processes the input signal and performs an arithmetic operation or the like. Thus, the X-Y detection circuit 20 detects the (x, y) coordinates of the input point touched on the surface of touch panel 14 and transmits such information to CPU 22. Touch panel detection circuit 18, X-Y detection circuit 20 and the CPU 22 combine to form controller 16. Controller 16 performs the control in accordance with the control program stored in program ROM 26 in memory, 24. The ROM section in memory 24 includes program ROM 26 in which the control program of CPU 22 is stored and pattern data area to store various kinds of character patterns or the like. RAM section 28 of memory 24 includes a RAM portion which is used as a work area of CPU 22 and a character position data area 30 to store display positions of character patterns and the like.

Specifically, in FIG. 2 touch panel 14 is an electronic input device such as an a hand-held electronic notepad or a wall-sized electronic Liveboard, which employs a working surface and may employ a plurality of accessible functions 40 as is shown. The working surface is the upper area 36 of touch panel 14 and the accessible touch responsive functions 40 are displayed at the bottom area 38 of touch panel 14. These functions 40 may include new operation (draw mode), delete, move, shrink and so on. Alternatively, these functions can be accessed by a pie-menu. These functions however are optional in designation, their principal objects being to define operations which are inherent in the operation of the system. These functions may share the some of the same functions that are represented by many designated command gestures.

A suitable user manipulable control or interacting device such as a stylus or light pen or the like 42 is employed to direct the controller system to draw input symbols, select functions or draw gestures representative of specified functions. Obviously, other variants within the skill of the art may be employed.

In FIG. 2a the user has created objects 34 and has selected these objects by drawing loop gesture 32 around them.

The operations of a drawing editing system which incorporates the present invention is illustrated in FIG. 3. These operations are as follows.

The touch panel 14 remains inactive until a signal is sensed from a user's action. A user has the option of touching any of the accessible functions to activate touch panel 14. However, once a user selects an item on touch panel 14, the touch panel is activated. That is, if touch panel 14 is in a DRAW mode under the control structure, the user then may draw desired objects on touch panel 14. When the user desires to manipulate the objects drawn, the user may then draw a gesture. A gesture is sensed by the system when the user performs some action prior to drawing the gesture. This action may usually be holding a button on the pointing device. However other actions may be designed to inform the system that a gesture as opposed to other information is being input into the system. Such an action is identified by decision diamond 50. In some cases however the system may automatically interpret a stroke as a gesture instead of other input data without any additional action on the part of the user.

If the user decides to draw a gesture, there are many to choose from, each having a well defined shape that is recognized by the system as a command gesture when it is drawn. For example if the user wishes to delete an object, he/she may draw a freeform circle around desired objects as is shown in FIG. 2a. The system then detects the shape of gesture as a selection of items, stores the gesture and the items enclosed, and displays such gesture. Once items are selected the user may desire to delete those objects enclosed by drawing a curled line connected to the circled figure. The system then detects the shape of the gesture as a delete command, and executes such command. This is an example of two command gestures drawn and executed separately. Command gestures however can also be concatenated, i.e., connected to together in series, each being recognized only by the shape and gestural break features employed. Such break features are the subject of patent application Ser. No. 08/175,853, filed Dec. 30, 1993, entitled Apparatus and Method for Executing Multiple Concatenated Command Gestures in a Gesture Based Input System, discussed above.

Importantly, the system may be configured to recognize any segment as a complete gesture. For example the system may be instructed to recognize a partial loop as a selection gesture. FIGS. 2(b) and 2(c) illustrate two loop segments which represent the selection command gesture. Either figure may be used by the system to select desired objects. The only requirement is that each gesture must be precisely defined.

In FIG. 3, whether or not the user decides to draw information 52 or a (complete or incomplete) command gesture 54 on touch panel 14, the tip of the pointing device 42, i.e., its location is saved in Linepoint[1] at 56. The current point equals 1 at block 58. If the user is still touching the touch panel 14, at block 62 the system saves the location of the pointing device in a memory index called "newpoint." The system compares newpoint with the current point location at decision diamond 64. If the newpoint is different from the current point, i.e., if the user moves the pointing device on the screen from the current point, then the system detects if the newpoint is retracing at decision diamond 66. Obviously, if the user has not moved the stylus from the current position, then the newpoint is not different from the current point and the system returns to decision diamond 60.

If newpoint is retracing then the system erases the retraced portion of the line segment at block 68. The system then returns to decision diamond 60. Now if newpoint is not retracing, the system draws a line segment to newpoint, i.e., the point under the pointing device at block 70. The system then adds one value to the current point at block 72, saves the newpoint as the current point at block 74, and returns to decision diamond 60.

Now if the user removes the stylus 42 from touch panel 14, as stated above, the system detects whether a gesture or information ("ink") is entered on touch panel 14. This is identified by decision diamond 76. If the user has instructed the system that a gesture is entered, then the system interprets the point list as a gesture and executes the command associated with the gesture. Otherwise the system interprets the pointlist as information, i.e., "ink" and acts accordingly.

The system procedures upon which the flowhchart shown in FIG. 3 is based is set forth with numbers which refer to the those shown FIG. 3.

```
If mode is command (50)
    gesture = true (54)
else
    gesture = false (52)
LinePoint[1] = PenXYLocation (56)
Currentpoint = 1 (58)
repeat while touch is detected (60)
    Newpoint = PenXYLocation (62)
    IF NewPoint != LinePoint[CurrentPoint] (64)
        if Retraces (LinePoint, Newpoint, Currentpoint) (66)
            CurrentPoint =
                Erase (LinePoint, NewPoint, Currentpoint) (68)
        else
            DrawLine (LinePoint[CurrentPoint], NewPoint); (70)
            CurrentPoint = CurrentPoint + 1 (72)
            LinePoint[CurrentPoint] = NewPoint (74)
if Gesture is True (76)
    interpret PointList as Gesture (78)
else
    interpret PointList as ink (80)
done
```

The procedures described above are called the moment the stylus 42 touches the touch panel 14. Specifically, such procedures entail using an array of x,y points called LinePoint to capture the mark being drawn on the touch panel. A sub-procedure called PenXYLocation senses and returns the x,y location of the stylus on the touch panel. The sub-procedure DrawLine draws a line on the display between two given points.

The function "Retraces" takes a point P, LinePoints and the index of the endpoint of the mark in LinePoints to determine if retracing would occur if P were added into LinePoints. Retraces returns true when the tail of the mark described by LinePoints with P included traces back over itself with some tolerance T for a length L. That is, the system detects backtracing and continues erasing even when the tip of the stylus deviates varying distances from the actual line segment drawn. This is discussed in more detail below.

The function "Erase" takes LinePoints, the index of the endpoint of the mark in LinePoints and a point P which caused Retrace to return true. Erase erases from the screen the section of the mark being retraced. Erase returns the new index in LinePoints to start adding points.

It is noted that if the user retraces the entire gestural stroke, the gesture is aborted. It is also important to note that in the preferred embodiment, the system will be configured to be very flexible and detect backtracing at large deviations from the actual line. Thus, a stroke that is drawn near the first line gesture by the user in an attempt to erase by retracing the entire line segment will be detected as a backtrace command. In effect, the retracing stroke will be acting as a command gesture to erase the first line command gesture. However, the system can be set to detect many variation distances.

In this way the user may draw a line gestural stroke, retrace some or all of it, and draw again and continue this process as many time as the user wishes.

FIGS. 4(a–h) illustrate an example of the operations described above. In FIG. 4(a) the user begins to draw a gestural mark with pointing device 42. After the user has drawn a portion of the first gesture, he/she has decided that the first gesture was not desired as shown in FIG. 4(b). In FIG. 4(c) the user then begins to retrace the unwanted gesture by backtracing. Shortly after the user begins to retrace, the system detects that the user has reversed direction and erases the gesture during backtrace. This is shown in FIG. 4(d). In FIG. 4(e) the user has backtraced to the point where the gesture drawn is correct, and the user begins to extend the gesture correctly, shown in FIG. 4(f). Shortly thereafter the system detects that the user is extending the gesture in a new direction, tracks the trace and draws the new gesture. This is shown in FIG. 4(g). In FIG. 4(h) the user has completed the gesture correctly.

It is important to note that the system is designed to erase when a predetermined portion of the line is retraced. That is, the system detects when a threshold portion of the line is retraced before it begins erasing. This prevents erasing in the situation when the user hand becomes unsteady or noise in the system creates an unwanted retrace. Also, the system will not retrace if the user loops back around to trace over the original line.

It is also important to note that backtracing technique is limited only in that it restricts the valid gesture shapes to those that do not retrace over themselves, such as, for example, a scratchout gesture which is comprised of a closely spaced zig-zag pattern.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

We claim:

1. A graphic editing system including a surface and user controllable means for generating a first line image on said surface comprising:

first means responsive to a first user action by said user controllable means for generating said first line image on said surface that terminates at first given coordinates on said surface; and second means responsive to a second user action, which is carried out by said user controllable means subsequent said first user action, that retraces at least a portion of said first line image from said first given coordinates back to second given coordinates for erasing said portion of said first line image.

2. The system according to claim 1 further comprises third means responsive to a third user action that extends from said second given coordinates in a direction other than the direction that retraces said first line image for generating a second line image extending in said other direction from said second given coordinates.

3. The system according to claim 1 wherein said first given coordinates represent a first point on said first line image.

4. The system according to claim 3 wherein said second means includes means for erasing said portion of said first line image up to said second given coordinates which represent a second point on said first line image.

5. The system according to claim 4 further comprising third means responsive to a third user action subsequent said second user action that extends from said second point in a direction other than the direction that retraces said line image for generating a second line image extending in said other direction from said second point.

6. The system according to claim 5 wherein said second means has first means for detecting a change from said first to said second user actions.

7. The system according to claim 6 wherein said second means further has second means for detecting a change from said second to said third user action.

8. The system according to claim 1 further comprising means responsive to said first action for storing said first given coordinates.

9. The system according to claim 1 wherein said first line image represents a command.

10. The system according to claim 9 further comprises means for executing said first command.

11. The system according to claim 5 wherein said second line image includes the remaining portion of said first line image.

12. The system according to claim 11 wherein said second line image represents a command.

13. The system according to claim 12 further comprises means for executing said second command.

14. The system according to claim 8 further comprising means for retrieving said first given coordinates from said storing means and displaying said first given coordinates on said surface.

15. A graphic editing system including a surface and user controllable means for generating a first line image on said surface comprising:

first means responsive to a first user action for generating said first line image on said surface that terminates at a first point on said first line image having given coordinates on said surface; and second means responsive to a second user action, subsequent said first user action, that retraces at least a portion of said first line image from said first point to a second point thereon for erasing said portion of said first line image between said first and second points on said first line image.

16. The graphic editing system of claim 15 wherein said second means comprises means responsive to a third user action subsequent said second user action that extends from said second point in a direction other than the direction that retraces said first line image for generating a second line image extending in said other direction from said second point.

17. The system according to claim 15 wherein said second means comprises means responsive to a third user action, subsequent said second user action, that extends from said given coordinates in a direction other than the direction that retraces said first line image for generating a third line image extending in said other direction from said second point.

18. The system according to claim 15 wherein said second means has first means for detecting a change from said first to said second user actions.

19. The system according to claim 16 wherein said second means further has second means for detecting a change from said second to said third user action.

20. The system according to claim 15 further comprising means responsive to said first action for storing said given coordinates.

21. The system according to claim 15 wherein said first line image represents a command.

22. The system according to claim 21 further comprises means for executing said command.

23. The system according to claim 16 wherein said second line image includes the remaining non erased portion of said first line image.

24. The system according to claim 16 wherein said second line image represents a second command.

25. The system according to claim 24 further comprises means for executing said second command.

26. The system according to claim 21 further comprising means for retrieving said first given coordinates from said storing means and displaying said first given coordinates on said surface.

27. A method for graphic editing on a surface in a system having a user controllable means for generating a first line image on said surface, said method comprising:

generating said first line image on said surface in response to a first movement of said user controllable means on said surface, said first line image terminating at a first point on said first line image and having given coordinates on said surface; and erasing only said first line image on said surface between said first point and a second point on said first line image in response to a second movement of said user controllable means continuously retracing said first line image, within a predetermined distance of said first line image, from said first point to said second point, subsequent said first movement.

28. The method of claim 27 further comprising generating a second line image on said surface in response to a third movement of said user controllable means on said surface subsequent said second movement thereof, that extends from said second point in a direction other than the direction that retraces said first line image, said second line image extending in said other direction from said second point.

29. The system according to claim 10 wherein said second means includes means for retracing said first line image completely for erasing the entire said first line image and aborting said command.

30. The system according to claim 1 wherein said second means includes means that retraces at said portion of said line image within a predetermined distance from said first line image for erasing said portion of said first line image.

31. The system according to claim 1 wherein said second means includes a means for detecting said retracing and means for erasing said portion of said line image after a predetermined distance of said line image is retraced.

32. The system according to claim 1 wherein said line image is a freehand stroke.

33. The system according to claim 15 wherein said line image comprises a plurality of concatenated command gestures.

34. The system according to claim 10 wherein said second means comprises means for causing said portion of said first line image to be erased before said first command represented by said first line image is executed.

35. The system according to claim 22 wherein said second means comprises means for causing said portion of said first line image to be erased before said first command represented by said first line image is executed.

36. The method of claim 27 wherein said first line image represents a command and said erasing only said first line image between said first point and a second point occurs before said first command represented by said first line image is executed.

* * * * *